United States Patent Office 3,696,089
Patented Oct. 3, 1972

3,696,089
SOLUTIONS CONTAINING A BASIC DYESTUFF AND AN α- OR β-HYDROXY- OR LOWER ALKOXY LOWER ALKYLNITRILE
Roderich Raue, Leverkusen, and Karlheinz Wolf, Cologne-Stammheim, Germany, assignors to Farbenfabriken Bayer Aktiengesellschaft, Leverkusen, Germany
No Drawing. Continuation of application Ser. No. 550,919, May 18, 1966. This application Mar. 24, 1970, Ser. No. 20,462
Int. Cl. C09b 67/00; D06p 1/64, 1/86
U.S. Cl. 260—156                           4 Claims

ABSTRACT OF THE DISCLOSURE

Solutions of basic dyestuffs containing 20 to 80% of basic dyestuff, 5 to 80% of a lower α- or β-hydroxy-alkylnitrile or α- or β-lower alkoxy lower alkylnitrile.

This application is a continuing case based on our prior copending application Ser. No. 550,919, filed May 18, 1966, now abandoned.

The present invention relates to stable concentrated solutions of basic dyestuffs which contain inorganic or organic acid radicals as anion.

It is already known to use solutions of basic dyestuffs in the paper, textile and leather industries. The hitherto proposed combinations either do not permit the preparation of sufficiently concentrated solutions or require, when basic dyestuffs are used in the form of salts of water-soluble carboxylic acids, an additional process step in order to convert the chlorides of the basic dyestuffs, normally formed in the production, into the salts of organic acids via the dye bases. In addition, a fairly large number of such basic dyestuffs do not survive the conversion into the free base or do so only if especially mild conditions are maintained. In the subsequent transformation into the salt of an organic acid, the instability of the dye base may become noticeable by a decrease of the colour strength or a turbidity of the colour shade. Dyestuffs of this type include, for example, Rhoduline Pure Blue 3G (C.I. 51005) and Auramine O (C.I. 41000).

It has now been found that stable concentrated solutions of basic dyestuffs which contain organic or inorganic acid radicals as anion are obtained, when basic dyestuffs in the form of the free bases or as organic or inorganic salts are stirred with liquid lower α- or β-hydroxyalkyl nitriles or liquid lower α- or β-alkoxyalkyl nitriles, optionally in the presence of water-soluble organic acids and water and, if desired, also with the addition of other suitable organic solvents; if necessary, the inorganic salts still present from the production may then be filtered off. For the preparation of the solutions the basic dyestuffs are preferably employed in the dry or ground form or in the form of moist filter cakes. The components of the solution are stirred at room temperature or at an elevated temperature.

Basic dyestuffs which may be used are, for example, methine, azomethine, hydrazone or azacyanine dyestuffs, dyestuffs of the di- or triaryl-methane series, xanthene, thioxanthene, acridine, oxazine, thiazine and phenazine dyestuffs as well as basic dyestuffs of the azo, anthraquinone or phthalocyanine series.

Of the large number of basic dyestuffs which can be used, the following are suitable for the preparation of highly concentrated solutions, for example Colour Index 2nd ed. (1956): No.
Indolenine Yellow _____ 48,010
Fanal Violet 3R supra _____ 48,013
Astrazon Pink FG _____ 48,015

Colour Index 2nd ed. (1956): No.
Astrazon Violet R _____ 48,030
Astrazon Red 6B _____ 48,020
Astrazon Orange G _____ 48,035
Astrazon Orange R _____ 48,040
Astrazon Yellow 3G _____ 48,055
Basic Yellow EFCM new _____ 48,060
Astra Phloxin FF extra _____ 48,070
Methyl Violet _____ 42,535
Crystal Violet _____ 42,555
Victoria Blue R _____ 44,040
Malachite Green _____ 42,000
Fast New Blue 3R _____ 51,175
Rhoduline Pure Blue 3G _____ 51,005
Chrysoidine G _____ 11,270
Chrysoidine RL _____ 11,320
Safranine T _____ 50,240
Thioflavine _____ 49,005
Rhodamine B _____ 45,170
Rhoduline Orange NO _____ 46,005
New Fuchsine _____ 42,520

The lower α- or β-hydroxyalkylnitriles and lower α- or β-alkoxyalkylnitriles to be employed shall be liquid at room temperature. As suitable compounds there may be taken into consideration, for example: glycolic acid nitrile, lactic acid nitrile, β-hydroxy-propionitrile, ethoxyacetic acid nitrile, β-ethoxy-propionitrile, β-hydroxy-ethoxy-propionitrile, β-ethoxy - ethoxy - propionitrile; among these, β-hydroxy-propionitrile is of particular interest. The lower α- or β-hydroxy or -alkoxynitriles are preferably present in the dyestuff solutions in an amount of from about 5 to about 80 percent calculated on the total amount of the solution.

The solutions may contain water, preferably in amounts of 0.1 to 40%.

As examples of water-soluble organic acids which may also be present in the solutions, there may be mentioned: formic acid, acetic acid, propionic acid, glycollic acid, ethoxy-acetic acid, lactic acid and diglycollic acid. The amount of water-soluble organic acids preferably varies between 0.1 to 50% of the weight of the entire composition.

Further organic solvents which may be added are, inter alia, polyhydric alcohols or their esters or ethers; there may be mentioned, for example, glycol, methyl glycol, butyl glycol, diethylene glycol, 3-chloropropane-diol, butane-1,3-diol, 3'-methoxy butanol, hexane-1,6-diol, butine-1,4-diol, diethylene glycol monoethyl ether and glycol carbonate. The further organic solvents may be present in the dyestuff solutions in an amount of from about 0.1 to 40%.

The solutions according to the invention are miscible with water or with suitable organic solvents in any ratio. The solutions contain the basic dyestuff in amounts of about 20 to 80% dyestuff, referred to the total weight of the solution. It is obvious that the solutions may also contain mixtures of two or more basic dyestuffs.

In comparison with acetonitrile already proposed for dissolving salts of basic dyestuffs with organic acids, the hydroxynitriles to be used according to the present invention are distinguished by a substantially better solubilizing power. Whereas a solution of 19 g. Rhoduline Pure Blue 3G in 100 g. acetonitrile crystallises out already at room temperature, a solution of 33 g. Rhoduline Pure Blue 3G in 100 g. β-hydroxy-propionitrile, for example, is still clear after standing in a refrigerator for 4 weeks.

The following examples are given for the purpose of illustrating the invention; the parts are parts by weight and the temperature is given in degrees centigrade.

EXAMPLE 1

200 parts Rhoduline Pure Blue 3G are added to 800 parts β-hydroxy-propionitrile. The mixture is stirred on a boiling water bath for one hour and then filtered off with suction. A clear dyestuff solution is obtained which is still stable even at 0°.

EXAMPLE 2

A mixture of 50 parts of the basic dyestuff described in Example 1 of the French patent specification No. 1,145,752 and 50 parts β-hydroxy-propionitrile is stirred at 60° for a half hour, then cooled to room temperature and filtered. A concentrated dyestuff solution is obtained which is eminently suited for dyeing materials of polyacrylonitrile.

EXAMPLE 3

308 parts Basic Yellow EFCM New, which is present as chloride in the form of a sodium chloride-containing manufactured material, are introduced into a mixture of 385 g. 80% lactic acid and 280 g. β-hydroxy-propionitrile. The reaction mixture is heated to 95°, stirred at this temperature for one hour and filtered off with suction from the sodium chloride. The filtrate is mixed with 85 parts water and stirred at room temperature for a half hour. A solution is obtained which is eminently suited for dyeing materials of polyacrylonitrile.

EXAMPLE 4

300 parts of the third dyestuff of the table to Example 1 of German Pat. No. 1,083,000, in the form of the chloride, are introduced into a mixture of 350 parts 80% lactic acid, 280 parts β-hydroxy-propionitrile and 270 parts water. The mixture is heated to 95°, stirred at this temperature for one hour and the dyestuff solution is then filtered off.

In place of lactic acid there may be used with equal result equivalent amounts of methoxy acetic acid, ethoxy acetic acid, glycolic acid, methoxypropionic acid, ethoxypropionic acid, acetic acid or propionic acid. If β-hydroxypropionitrile is replaced by the equivalent amount of β-methoxy-propionitrile, β-ethoxy-propionitrile, β-butoxy-propionnitrile or mixtures thereof with methylglycol, butylglycol, glycerin monoacetate or glycerine triacetate stable dyestuff solutions are likewise obtained.

EXAMPLE 5

180 parts of the first dyestuff of the table to Example 1 of German Pat. No. 1,083,000, in the form of the chloride, are introduced into a mixture of 215 parts glacial acetic acid, 300 parts β-hydroxy-propionitrile and 305 parts water. The mixture is heated to 95°, stirred at 95° for one hour and the dyestuff solution is filtered off with suction.

Instead of the dyestuff mentioned above the following dyestuffs may be used with equal results to obtain stable dyestuff solutions: the fourth or fifth or sixth or seventh dyestuff of the table belonging to Example 1 of German Pat. 1,083,000, in form of the dyestuff basis or the dyestuff chlorides; the dyestuff of Example 2 or 4 of German Pat. 1,209,679; the dyestuff of Example 1 of German Pat. 1,044,022.

EXAMPLE 6

210 parts of the basic dyestuff described in Example 1 of German Pat. No. 1,165,790, in the form of the hydrochloride, are introduced into a mixture of 510 parts of 80% lactic acid and 250 parts β-hydroxy-propionitrile, the mixture is heated to 95° and stirred at this temperature for one hour. The solution is then filtered off with suction from the sodium chloride and diluted with 120 parts water. The solution of the basic dyestuff is eminently suited for dyeing materials of polyacrylonitrile.

In place of the dyestuff mentioned above the following dyestuffs may be used with equal result: the dyestuffs described in Example 2, 4 or 5 of German Pat. 1,165,790; acetic acid, 395 parts β-hydroxy-propionitrile and 320

EXAMPLE 7

330 parts of the basic dyestuff described in Example 3 of German Pat. No. 1,190,126, in the form of the chloride, are introduced into a mixture of 655 parts ethoxyacetic acid, 395 parts β-hydrovy-propionitrile and 320 parts water. The mixture is heated to 95°, stirred at this temperature for one hour and the dyestuff solution is filtered off with suction.

EXAMPLE 8

40 parts of the basic dyestuff described in Example 30 of German Pat. No. 1,011,396 are introduced, in the form of the dye base, into a mixture of 5 parts lactic acid and 55 parts β-hydroxy-propionitrile. The mixture is stirred at 60° for a half hour and then filtered off.

EXAMPLE 9

42 parts of the basic dyestuff described in Example 38 of German Pat. No. 1,011,396 are introduced, in the form of the dye base, into a mixture of 20 parts formic acid, 28 parts β-hydroxy-propionitrile and 10 parts water. The mixture is stirred at 60° for one hour and then filtered off.

With the same result the following dyestuffs may be used in this example to stable dyestuff solutions thus being obtained: the dyestuffs described in Examples 21, 22, 23, 26, 29, 32, 34, 35, 48 or 49 of German Pat. 1,011,396.

We claim:

1. Concentrated solution of basic dyestuff containing 20–80% of basic dyestuff, 5–80% of a lower α- or β-hydroxy-alkylnitrile or α- or β-lower alkoxy lower alkylnitrile.

2. Concentrated solution of basic dyestuff of claim 1 containing a lower α- or β-hydroxy-alkylnitrile or α- or β-lower alkoxy lower alkylnitrile and in addition 0.1–40% of water and 0.1–50% of a water-soluble aliphatic organic acid selected from the group consisting of formic acid, acetic acid, propionic acid, glycollic acid, ethoxy acetic acid, lactic acid, diglycollic acid, methoxy acetic acid, methoxy propionic acid, and ethoxy propionic acid.

3. Concentrated solution of basic dyestuff of claim 1 containing β-hydroxy-propionitrile as lower β-hydroxy-alkylnitrile.

4. Concentrated solution of basic dyestuff of claim 1 containing 20–80% of basic dyestuff, 5–80% of β-hydroxy-propionitrile, 0.1–40% of water, 0.1–50% of a water soluble aliphatic organic acid selected from the group consisting of formic acid, acetic acid, propionic acid, glycollic acid, ethoxy acetic acid, lactic acid, diglycollic acid, methoxy acetic acid, methoxy propionic acid, and ethoxy propionic acid and 0.1–40% of an organic solvent selected from the group consisting of glycol, methyl glycol, butyl glycol, diethylene glycol, 3-chloropropane-diol, butane-1,3-diol, 3'-methoxy butanol, hexane 1,6-diol, butine-1,4-diol, diethylene glycol monoethylene ether and glycol carbonate.

References Cited

UNITED STATES PATENTS

| | | | |
|---|---|---|---|
| 2,939,759 | 6/1960 | Scalera et al. | 8—83 X |
| 3,206,274 | 9/1965 | Myles | 8—83 X |
| 3,346,322 | 10/1967 | Finkenauer et al. | 8—93 X |

FLOYD DALE HIGEL, Primary Examiner

U.S. Cl. X.R.

8—83, 92, 93; 260—158, 165, 205, 240 R, 240.1, 240.65, 240.9, 244 R, 250 R, 279 R, 288 R, 304, 314.5, 326.15 R, 332, 372, 388, 391, 393, 566 F

UNITED STATES PATENT OFFICE
CERTIFICATE OF CORRECTION

Patent No. 3,696,089  Dated October 3, 1972

Inventor(s) Roderich Raue and Karlheinz Wolf

It is certified that error appears in the above-identified patent and that said Letters Patent are hereby corrected as shown below:

| COLUMN | LINE | ERROR |
|---|---|---|
| 3 | 43 | "propionnitrile" should read --propionitrile--. |
| 4 | 3 | "acitic acid, 395 parts $\beta$-hydroxy-propionitrile and 320" should be deleted and the following added --the dyestuffs of example 2 or 3 of German Patent 865,925.-- |
| 4 | 10 | "$\beta$-hydrovy-" should read --$\beta$-hydroxy- ---. |

Signed and sealed this 29th day of October 1974.

(SEAL)
Attest:

McCOY M. GIBSON JR.
Attesting Officer

C. MARSHALL DANN
Commissioner of Patents